(12) United States Patent
Thaxton et al.

(10) Patent No.: US 9,009,949 B1
(45) Date of Patent: Apr. 21, 2015

(54) METHOD FOR PARTIALLY CURED INSULATORS FOR ELECTROMAGNETIC SYSTEMS

(71) Applicant: DRS Power Technology, Inc., Fitchburg, MA (US)

(72) Inventors: Edgar S. Thaxton, Groton, MA (US); Gregory Cervenka, Houston, TX (US); Raymond Jones, Oxford, MA (US); Eric Tripodi, Marlborough, MA (US)

(73) Assignee: DRS Power Technology, Inc., Fitchburg, MA (US)

(*) Notice: Subject to any disclaimer, the term of this patent is extended or adjusted under 35 U.S.C. 154(b) by 114 days.

(21) Appl. No.: 13/665,834

(22) Filed: Oct. 31, 2012

Related U.S. Application Data

(63) Continuation of application No. 13/587,671, filed on Aug. 16, 2012, now abandoned.

(60) Provisional application No. 61/524,198, filed on Aug. 16, 2011.

(51) Int. Cl.
*H02K 15/10* (2006.01)
*H02K 15/12* (2006.01)
*H02K 15/02* (2006.01)

(52) U.S. Cl.
CPC ............... *H02K 15/12* (2013.01); *H02K 15/02* (2013.01)

(58) Field of Classification Search
CPC .... H02K 15/12; H02K 15/022; H02K 15/066
USPC ........ 29/596–598, 605–606, 732; 310/8, 179, 310/194, 215; 427/116, 185
See application file for complete search history.

(56) References Cited

U.S. PATENT DOCUMENTS

| | | | |
|---|---|---|---|
| 2,757,298 A | 7/1956 | Botts et al. | |
| 3,631,590 A * | 1/1972 | Wichmann et al. | 29/596 |
| 3,838,502 A * | 10/1974 | Sheets | 29/596 |
| 3,937,855 A | 2/1976 | Gruenwald | |
| 4,160,926 A | 7/1979 | Cope et al. | |
| 4,349,651 A | 9/1982 | Smith | |
| 4,616,407 A * | 10/1986 | Tamaki et al. | 29/596 |
| 5,115,556 A * | 5/1992 | Gavrilidis et al. | 29/596 |
| 6,202,285 B1 | 3/2001 | Bell | |
| 6,481,089 B1 * | 11/2002 | Enomoto et al. | 29/596 |
| 7,305,752 B2 * | 12/2007 | Graham et al. | 29/602.1 |
| 7,513,029 B2 * | 4/2009 | Ortt et al. | 29/596 |

* cited by examiner

*Primary Examiner* — Minh Trinh
(74) *Attorney, Agent, or Firm* — Kilpatrick Townsend & Stockton LLP

(57) ABSTRACT

A method of fabricating an electric machine stator includes inserting one or more electrical coils into a form and partially curing the one or more electrical coils. The method also includes populating the electric machine stator with the one or more electrical coils and curing the electric machine stator with one or more electrical coils.

11 Claims, 4 Drawing Sheets

WRAPPING OPTIONS FOR SLOT PORTIONS

WRAPPING OPTIONS FOR END-TURN PORTIONS

METHOD FOR PARTIALLY CURED INSULATORS FOR ELECTROMAGNETIC SYSTEMS

CROSS-REFERENCES TO RELATED APPLICATIONS

This application is a continuation of U.S. patent application Ser. No. 13/587,671, filed on Aug. 16, 2012, now abandoned, which claims priority to U.S. Provisional Patent Application No. 61/524,198, filed on Aug. 16, 2011, entitled "Method and System for Partially Cured Insulators for Electromagnetic Systems," the disclosures of which are hereby incorporated by reference in their entirety for all purposes.

BACKGROUND OF THE INVENTION

In electric machines such as electric motors and electric generators, a cylindrical stator typically with a body made of iron has longitudinal slots formed on the interior surface of the stator. The slots are fitted with electrical coils typically made of a conductive material such as copper to create a rotating magnetic field as a rotor in the center of the stator spins relative to the stator and electrical current is passed through the coils. For small motors such as those found in some household appliances, a number of individual enameled wires are wound into the slots of the stator to form the electrical coils.

Despite the progress made in the development of electrical systems, there is a need in the art for improved methods and systems related to electric motors and electric generators.

SUMMARY OF THE INVENTION

The present invention relates generally to electric machines. More specifically, the present invention relates to methods and systems for fabricating electrical coils (e.g., form coils), by impregnating and partially curing the electrical coils with a resin prior to insertion into an electric machine stator. The present invention provides superior quality insulation to prolong the longevity of the electrical coils and the electric machines.

According to one embodiment, a method for fabricating an electrical coil includes wrapping the electrical coil and inserting the electrical coil into a mechanical form. The electrical coil held in the mechanical form is impregnated with resin using a vacuum pressure impregnated (VPI) process. The electrical coil is then partially cured into a gelled state, and is stored in the partially cured gelled state until the electrical coil is ready to be installed into an electric machine stator.

According to one embodiment, a method for fabricating an electric machine stator includes providing one or more electrical coils in the partially cured gelled state. The electric machine stator is populated with the electrical coils while the electrical coils are still in the partially cured gelled state. After the electric machine stator has been fully populated, the electric machine stator with the installed electrical coils is impregnated with resin using a global VPI process. After the global VPI process is performed, the electric machine stator with the installed electrical coils are then fully cured to solidify the resin before the electric machine stator is put into operation.

Numerous benefits are achieved by way of the present invention over conventional techniques. For example, embodiments of the present invention improve the quality and longevity of insulation of form coils by impregnating the form coils with a resin and partially curing the form coils into a gelled state prior to insertion into a stator. Partially curing the form coils helps retain the impregnated resin and can reduce or eliminate resin drain-out after the VPI process is complete and before the resin is cured. By reducing or eliminating resin drain-out and the air pockets caused by resin drain-out, a more uniform insulation finish on the form coils can be achieved, which reduces partial discharge activity and improves the longevity of the insulation.

Additionally, partial curing of the form coils separate from the stator allows the use of smaller VPI process equipment that provides superior vacuum and/or higher impregnating pressure and results in higher quality insulation in comparison to the use of large global VPI process equipment for impregnating entire stator assemblies. Another benefit of embodiments of the present invention is that the amount of excess resin build-up on the form coil can be reduced. Excess resin build-up on the form coil can lead to cracking and delamination of the insulation, both of which reduce the longevity of the insulation. Additionally, embodiments of the present invention allow partially cured form coils to be stored for an extended period of time in the partially cured gelled state. Finally, the flexibility of the partially cured gelled state of the form coil allows the form coils to be inserted into a wider range of machines over conventional fully cured coils, including machines that may have a stator with small slot pitch (e.g., high pole number permanent magnet motors). These and other embodiments of the invention, along with many of its advantages and features, are described in more detail in conjunction with the text below and attached figures.

DETAILED DESCRIPTION OF SPECIFIC EMBODIMENTS

Figure 1:
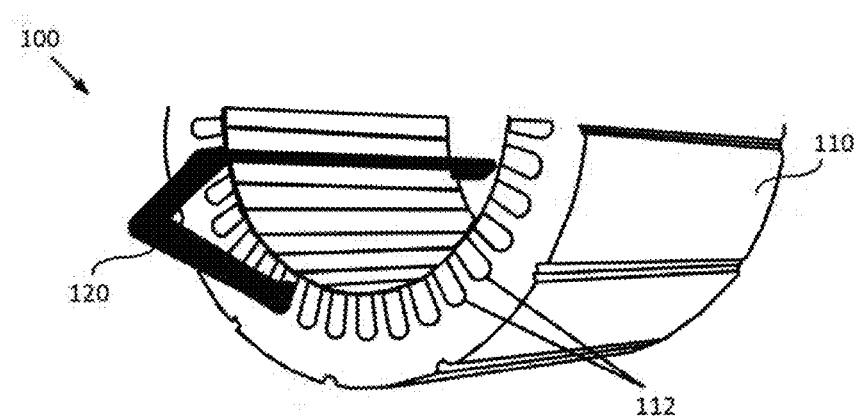
FIG. 1 illustrates a cut-out view of a portion of an electric machine stator, according to an embodiment of the present invention.

In large industrial machines, such as high voltage machines exceeding 1000 Volts, form coils that are capable of handling the high voltages are typically used instead of wound wires. Form coils are bundles of wires that are wrapped together into a predefined shape. Each form coil is insulated to electrically isolate the form coil from the iron body of the stator, and to electrically isolate the form coil from other coils that may be stacked together in the same slot of the stator. Poor insulation of form coils can lead to electrical shorts and partial discharges, reducing the longevity of the machine. Poor insulation of form coils can also lead to electrical losses in the coils, reducing the overall performance of the machine.

In electric machines with stators that use electrical coils (e.g., high voltage machines that use form coils), one way of providing insulation between the form coils and the body of a stator is to wrap each form coil in mica tape, insert the form coils into the slots of the stator, and globally submerge the stator assembly into a vacuum pressure impregnated (VPI) tank. The VPI tank is then filled with resin, and a vacuum is applied to impregnate resin through the mica tape to form an insulating layer. However, such a technique is susceptible to resin drain-out or resin seeping out from the mica tape when the stator assembly is being moved from the VPI tank to an oven for curing. Resin drain-out occurs because the resin is still in a liquid state when the stator assembly is removed from the VPI tank. The resin drain-out causes small voids and air gaps between the form coils and the stator. When a high voltage is applied to the machine during operation, these voids and air gaps become areas of high stress concentration due to the discontinuity in the dielectric constant associated with the voids/air gaps. As a result, the air in these voids and air gaps can become ionized, causing partial discharge of electricity to occur. Partial discharge is one major contributor to the degradation of the insulation of form coils.

Other techniques of providing insulation between the form coils and the body of a stator include using pre-insulated form coils, which can be referred to as "hard coils" or "B-stage coils." Hard coils are form coils that have been impregnated with resin and are fully cured before being inserted into the slots of the stator. However, the fully cured hard coils are inflexible and are difficult to install in stators with small slot pitch. Thus, while fully cured hard coils can be used in very large electric machines with few coils and large slots, fully cured hard coils may be unsuitable for machines with small slot pitch such as machines with a large number of poles.

Another type of pre-insulated form coils are B-stage coils. B-stage coils are form coils that are wrapped with resin-rich tapes that have resin added during the tape making process. After wrapping the resin rich tapes, the B-stage coils can be hot pressed or heated to shrink the wrapping into a snug fit to remove some of the air pockets. However, the types of resin that can be used in the resin-rich tapes of B-stage coils are limited and may provide inadequate insulating properties, because the resin used in such resin-rich tapes are selected for absorption and shelf-life of the tape. Insulation performance is often a secondary consideration for the resin used in such tapes.

Pre-insulated form coils such as hard coils and B-stage coils also suffer from the lack of a solid mechanical bond to the stator. The mechanical bond between the form coils and the stator helps remove heat via conduction from the form coils during operation. Without adequate heat removal, thermal aging of the form coils can accelerate. Thermal aging of the form coils during operation is another major contributor to the degradation of the insulation in form coils. Excessive heating of the form coils during operation can lead to delamination of the insulation. Without a mechanism to provide for adequate heat dissipation during operation, the usable lifetime of the form coil can be shortened.

Accordingly, embodiments of the present invention provide methods and systems for improving the insulation of form coils by impregnating the form coils with a resin and partially curing the form coils into a gelled state prior to insertion into a stator. In some embodiments, the form coils are inserted into a mechanical form and submerged into a vacuum pressure impregnated (VPI) tank to impregnate the form coils with resin. The form coils are partially cured, and are inserted into the slots of a stator in a gelled state. The partially cured gelled state of the form coils prevents resin drainage and provides mechanical flexibility to allow the shape of the form coils to be adjusted when fitting the form coils into the slots of a stator. After the form coils are inserted into the slots of the stator, the stator assembly can undergo a subsequent impregnation and oven curing process to enhance the mechanical bond between the form coils and the slots of the stator. The enhanced mechanical bond between the form coils and the slots of the stator provides improved heat dissipation for cooling of form coils during operation to prolong the longevity of the form coils.

FIG. 1 illustrates a cut-out view 100 of a stator 110 that can be used in an electric machine according to various embodiments. The diameter and depth of stator 110 can range from a few feet to tens of feet depending on the power rating of the electric machine. Stator 110 includes multiple slots 112 formed along the longitudinal direction on the interior surface of the cylindrically shaped stator 110. The number of slots can vary depending on the number of poles and number of phases of the electric machine. For example, the number of slots can range from six slots for a two-pole, three-phase machine with one slot per phase per pole, to hundreds of slots for machines with multiple poles and multiple slots per phase per pole. In FIG. 1, stator 110 is shown with a single form coil 120 installed. A fully populated stator would have form coils fitted into additional (e.g., every) slot of the stator. Each form coil is configured to be fitted into a pair of slots on the interior surface of the stator. The number of slots disposed between the pair of slots occupied by a single form coil depends on the number of poles and phases of the machine. According to some embodiments, each slot can be fitted with two form coils in a staggered configuration where two form coils occupying three slots share a common slot. In other embodiments, each slot can be fitted with one form coil or more than two form coils.

Figure 2:
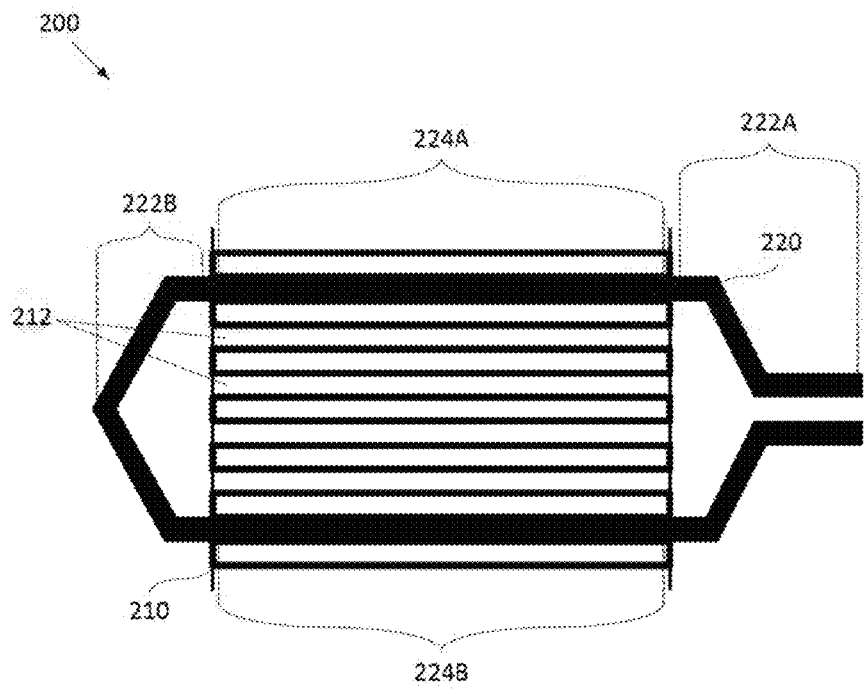
FIG. 2 illustrates a flattened view of a portion of an electric machine stator, according to an embodiment of the present invention.

FIG. 2 illustrates a flattened view 200 of the interior surface of a stator 210 with a single form coil 220 fitted into a pair of slots according to an embodiment of the present invention. As shown in FIG. 2, form coil 220 has a hexagonal-like shape. The horizontal portions of form coil 220 are referred to as the slot portions 224A and 224B. The slot portions 224A and 224B are the parts of form coil 220 that are fitted into and come in contact with slots 212 of stator 210. The bent or tapered portions of form coil 220 are referred to as the end-turn portions 222A and 222B. The end-turn portions 222A and 222B of form coil 220 are the parts of form coil 220 that protrude out of stator 210 once form coil 220 has been installed into stator 210. End-turn portion 222B is contiguous, and can include additional twists and turns (not shown) to adjoin the two slot portions 224A and 224B of form coil 220. End-turn portion 222A is detached, and provides connection points to allow form coil 220 to be coupled to other form coils and/or a power source.

In various embodiments, before the form coil is installed into a stator and prior to impregnating the form coil with resin in a coil impregnation process, the entirety of the form coil including both the slot portions and the end-turn portions is wrapped in an insulating tape (e.g., mica tape). The insulating tape absorbs resin during the coil impregnation process and provides structural support to retain the impregnated resin during the curing process. According to some embodiments, in addition to the insulating tape, for example, mica tape, the slot portions and/or the end-turn portions of the form coil can have additional layers of liners and/or wrappings. For example, because the slot portions of a form coil are positioned within the stator and are in physical contact with the stator during operation, an insulating slot liner can be used to prevent possible hot spots on the surface of the stator from scorching the slot portions of the form coil. A semi-conductive or conductive tape can also be used to provide an electrical ground wall and electric field grading to reduce partial discharge effects. In some embodiments, a semi-conductive or conductive slot liner can also be used to provide the benefits of both an insulating slot liner and a semi-conductive or conductive tape wrapping.

Figure 3A:
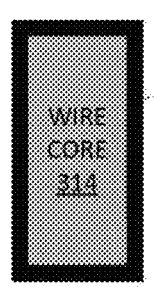
FIGS. 3A-D illustrates wrapping options for the slot portions of an electrical coil, according to various embodiments of the present invention.

The various wrapping options for the slot portions of a form coil in accordance to embodiments of the invention are shown in FIGS. 3A-3D. According to one embodiment, wrapping option 310 as illustrated in FIG. 3A includes mica tape 315 (or other insulating layer) wrapped around the wire core 314 of the slot portions of a form coil. Mica tape 315 can be made of mica paper with a glass cloth backing. In some embodiments, mica tape 315 can also include a small amount of resin additive (e.g., less than 20%, 10%, or 5% weight of the tape) to improve adhesion in the mica tape to prevent mica from flaking off the tape during installation. In other embodiments, mica tape 315 does not include any resin additive. Of the various wrapping options, wrapping option 310 is the simplest option and is the lowest cost option because it has the least number of wrapping layers. The minimal number of wrapping layers also makes wrapping option 310 suitable for use in stators with fine slot pitch.

Figure 3B:
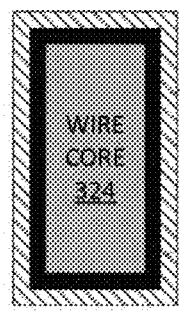
Figure 3C:
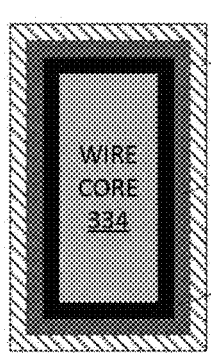

In another embodiment illustrated in FIG. 3B, wrapping option 320 includes mica tape 325 (or other insulating tape) wrapped around the wire core 324 of the slot portions of a form coil. In addition to mica tape 325, wrapping option 320 also includes an insulating slot liner 326. Insulating slot liner 326 can be made of a tear-resistant and/or flame-retardant material such as Nomex. Insulating slot liner 326 provides an additional layer of insulation and helps protect the form coil from hot spots on the surface of the stator during operation. In an alternative embodiment illustrated in FIG. 3C, wrapping option 330 includes a semi-conductive or conductive tape wrapping 337 between mica tape 335 and insulating slot liner 336. Semi-conductive or conductive tape wrapping 337 can be made of a conductive impregnated paper or carbon fiber. Semi-conductive or conductive tape wrapping 337 provides a conductive structure to define a ground wall geometry around the slot portions for electric field grading. This ground wall can be electrically separated from the ground potential of the iron stator, and act as an electrical barrier to reduce partial discharge.

Figure 3D:
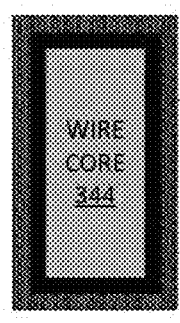

According to a different embodiment illustrated in FIG. 3D, wrapping option 340 includes mica tape 345 wrapped around the wire core 344 of the slot portions of a form coil. Instead of using an insulating slot liner and/or semi-conductive or conductive tape wrapping, wrapping option 340 includes a semi-conductive or conductive slot liner 348 over mica tape wrapping 345. Semi-conductive or conductive slot liner 348 can be made of carbon impregnated Nomex, carbon fiber, or the like. Semi-conductive or conductive slot liner 348 can provide both hot spot protection and ground wall isolation in one layer of wrapping. The slot liner can extend beyond the length of the insulating tape (e.g., mica tape), providing protection against discontinuities in the electrical field. Wrapping option 340 can be suitable for stators that demand superior insulation but have a small slot pitch limiting the number of wrapping layers that can be used.

It will be appreciated that the various wrapping options illustrated in FIGS. 3A-3D can be used to produce different configurations by combined one or more of the illustrated wrapping layers in combination, providing additional wrapping options including one or more of the layers illustrate in these figures. One of ordinary skill in the art would recognize many variations, modifications, and alternatives.

Figure 4A:
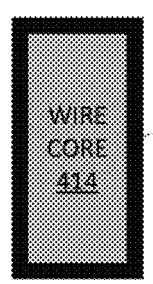
FIGS. 4A-B illustrates wrapping options for the end-turn portions of an electrical coil, according to various embodiments of the present invention.
Figure 4B:
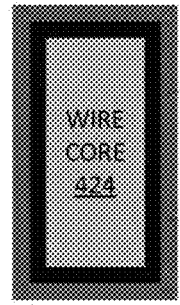

FIGS. 4A and 4B illustrates the various wrapping options for the end-turn portions of a form coil in accordance to embodiments of the invention. According to one embodiment illustrated in FIG. 4A, wrapping option 410 includes mica tape 415 wrapped around the wire core 414 of the end-turn portions of a form coil. Mica tape 415 of the end-turn portions can be continuous with the mica tape that is wrapped around the slot portions of the form coil. In other words, the entirety of the form coil can be wrapped in mica tape without any gaps between the sot portions and the end-turn portions.

According to another embodiment illustrated in FIG. 4B, wrapping option 420 for the end-turn portions of a form coil can include a semi-conductive or conductive tape wrapping 427 over mica tape 425. Because the end-turn portions are exposed to air, the locations where the end-turn portions adjoin the slot portions can be susceptible to partial discharge during operation due to the discontinuity in dielectric constant at these locations. Similar to the semi-conductive or conductive tape wrapping on the slot portions, the semi-conductive or conductive tape wrapping 427 provides a conductive structure to define a ground wall geometry around the end-turn portions to provide electric field grading to reduce partial discharge. Semi-conductive or conductive tape wrapping 427 can extend from the end-turn portions into the slot portions to provide continuity on the ground wall where the end-turn portions adjoin the slot portions.

As mentioned above, it should be appreciated that any of the various wrapping options described above can include additional wrapping layers that are not shown. Furthermore, each type of wrapping layer (e.g., mica tape, insulating slot liner, semi-conductive tape, semi-conductive slot liner) can be made with additional and/or alternative types of materials that are suitable for the particular type of wrapping layer. It should be understood that for a particular form coil, any of the wrapping options 310, 320, 330, and 340 for the slot portions can be used and combined with any of the wrapping options 410, and 420 for the end-turn portions. For example, a form coil according to one exemplary embodiment can have its slot portions wrapped according to wrapping option 340 and end-turn portions wrapped according to wrapping option 420. The particular combination for a form coil can be selected based on insulation performance, expected operating life, slot pitch, and/or manufacturing costs.

After the slot portions and the end-turn portions of a form coil have been wrapped according to any of the embodiments described above, the form coil is impregnated with resin with a vacuum pressure impregnated (VPI) system and the impregnated form coils are partially cured to a gelled state prior to being installed in a stator. By impregnating the form coils separately from the stator, the VPI process can be performed in a smaller chamber that provides superior vacuum and/or higher impregnating pressure than is possible in large, global VPI tanks that are used to impregnate entire stator assemblies. As a result of the improved conditions for the VPI process as a result of using a smaller chamber, a higher quality insulation finish on the form coils can be achieved. A smaller chamber also provides a smaller area of resin exposure to the atmosphere, reducing the possibility of emitting components into the atmosphere.

In various embodiments, a mechanical form can be used to hold and shape the form coil during coil impregnation in the VPI chamber. The mechanical form is made of a material, or coated with a material, that does not bond to the form coil during coil impregnation and the partial curing process. The form coil can remain in the mechanical form during the subsequent partial curing process. The form coil can also be stored in the mechanical form until the form coil is ready to be installed in a stator. The use of a mechanical form helps retain the impregnated resin and can reduce or eliminate resin drain-out when the form coil is removed from the VPI chamber. By reducing or eliminating resin drain-out and the air pockets caused by resin drain-out, a more uniform insulation finish on the form coils can be achieved. Another benefit of using a mechanical form is that the amount of excess resin build-up on the form coil can be reduced. Excess resin build-up on the form coil can lead to cracking and delamination of the insulation, which can cause foreign particles and debris to bombard the electric machine during operation. The use of a mechanical form provides structural constraints to limit the amount of resin that can build-up on the form coil.

A further benefit of using a mechanical form is that the amount of excess resin material subjected to the curing process can also be reduced. Excess resin material that did not bond to or has not been absorbed by the form coil during the VPI process, but subjected to a curing process is typically discarded, because the excess resin material can be in an unknown or uncertain state after being exposed to various environmental conditions. The environmental conditions may have altered the chemical state of the resin material, leaving the resin material in a state that may not be suitable for reuse in subsequent VPI applications. By using a mechanical form, the amount of resin material subjected to the curing process can be limited to the volume within the mechanical form, and consequently, the amount of discarded excess resin material can be reduced.

Table I illustrates options for insulation and grading useful for partially cured coils according to embodiments of the present invention. It should be noted that the invention is not limited to any particular combination of insulation and/or grading, but these examples are provided by way of illustration. One of ordinary skill in the art would recognize many variations, modifications, and alternatives.

| Option | Slot | | | Endturn | |
| --- | --- | --- | --- | --- | --- |
| | Insulation | Mechanical | Grading | Insulation | Grading |
| A | Mica Tape | none | none | Mica tape | none |
| B | Mica Tape and Insulating slot liner (e.g. Nomex) | Slot liner (e.g. Nomex) | none | Mica tape | none |
| C | Mica Tape | Semi-conductive slot liner (e.g. carbon impregnated Nomex or carbon fiber) | Semi-conductive slot liner | Mica tape | none |
| D | Mica Tape | Slot liner (e.g. Nomes) | Semi-conductive tape te,g, conductively impregnated tape or carbon fiber | Mica tape | none |
| E | Mica Tape | none | Done | Mica tape | Semi-conductive tape (e.g. conductively impregnated paper or carbon fiber) |
| F | Mica Tape and Insulating slot liner (e.g. Nomex) | Slot liner (e.g. Nomex) | none | Mica tape | Semi-conductive tape te,g, conductively impregnated paper or carbo fiber) |
| G | Mica Tape | Semi-conductive slot liner (e.g. carbon impregnated Nomex or carbon fiber) | Semi-conductive slot liner | Mica tape | Semi-conductive tape (e.g. conductively impregnated paper or carbon fiber) |
| H | Mica Tape | Slot liner (e.g. Nome) | Semi-conductive tape (e.g. conductively impregnated tape or carbon fiber) | Mica tape | Semi-conductive tape (e.g, conductively impregnated paper or carbon fiber) |

Table 2 illustrates processes that can be utilized to form electrical devices according to embodiments of the present invention. It should be noted that the invention is not limited to any of the particular processes in Table 2, but these examples are provided by way of illustration. One of ordinary skill in the art would recognize many variations, modifications, and alternatives.

TABLE 2

| | Coil | | | Stator | |
|---|---|---|---|---|---|
| Option | VPI | Cure | Insertion | VPI | Cure |
| A | none | none | dry | normal | oven |
| A' | none | none | dry | normal + heat (current or other) applied to gel in tank | Finish in oven |
| B | normal process on coil(s) alone | Partial in tank (current or other applied to gel in tank) | gelled | normal | Finish in oven |
| C | normal process on coil(s) | Full cure in tank (current or other applied to gel in tank) | hard | normal | Oven |
| D | normal process on coil(s) alone | Full cure in tank (current or other applied to gel in tank) | hard | None, wave springs or slot filler (glue) to secure coils) | None (wave springs or time-cure glue) or Oven (heat-cure glue) |

Figure 5:
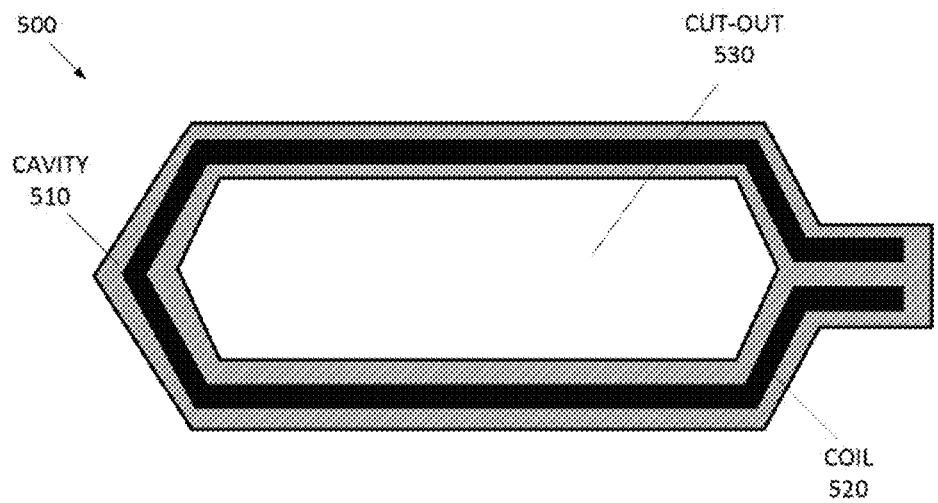
FIG. 5 illustrates a mechanical form, according to one embodiment of the present invention.

FIG. 5 illustrates a mechanical form 500 according to an exemplary embodiment. It should be noted that the dimensions of mechanical form 500 relative to the form coil 520 have been exaggerated in the figure for illustrative purposes. In the exemplary embodiment shown in FIG. 5, mechanical form 500 acts as a mold to set the shape of the entire form coil 520 including both the slot portions and the end-turn portions of form coil 520. Mechanical form 500 includes a cavity 510, which holds form coil 520 in place during coil impregnation. Cavity 510 is shaped substantially the same as or slightly larger than the shape of an installed form coil. In other words, cavity 510 has a shape that is similar to the final shape that the form coil would take on after the form coil has been inserted into a stator. In one embodiment, the slot portions of cavity 510 which sets the shape of the slot portions of form coil 520 can be a mockup of the receiving slots of a stator. The end-rum portions of cavity 510 can be formed according to the final shape of the end-turn portions of an installed form coil. In some embodiments, certain sections of cavity 510 that may be susceptible to voids can have a relaxed geometry and can be designed to have a larger clearance between the walls of mechanical form 500 and form coil 520 than other sections to improve the flow of resin in these sections during coil impregnation.

According to the embodiment shown in FIG. 5, mechanical form 500 includes a cut-out section 530 in the center of mechanical from 500 to define the interior shape of cavity 510. Cut-out section 530 reduces the volume of cavity 510 to prevent excess resin build-up and reduce the amount of discarded excess resin material as discussed above. In an alternative embodiment, mechanical form 500 may have a cut-out section with a different shape, or may not have a cut-out section at all to make the mechanical form easier to manufacture. The shape of mechanical form 500 can also be designed to optimize the number of mechanical forms that can be fitted into a VPI chamber.

Figure 6:
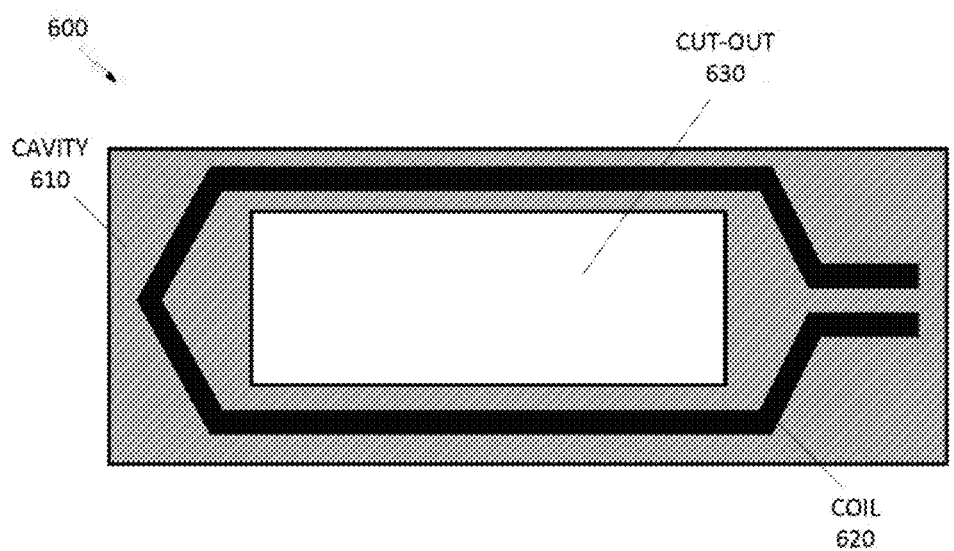
FIG. 6 illustrates a mechanical form, according to another embodiment of the present invention.

FIG. 6 illustrates a mechanical form 600 according to another embodiment. It should be noted that the dimensions of mechanical form 600 relative to the form coil 620 have been exaggerated in the figure for illustrative purposes. In the exemplary embodiment shown in FIG. 6, mechanical form 600 acts as a mold to set the shape of the slot portions of form coil 620, but does not set the shape of the end-turn portions. Mechanical form 600 includes a cavity 610 which holds form coil 620 in place during coil impregnation. The slot portions of cavity 610 are shaped substantially the same as or slightly larger than the slot portions of an installed form coil. In one embodiment, the slot portions of cavity 610 can be a mockup of the receiving slots of a stator.

Unlike mechanical form 500, the end-turn portions of cavity 610 in mechanical form 600 do not conform to the final shape of the end-turn portions of an installed form coil. The final shape of the end-turn portions of an installed form coil can include twists and turns that extend in all three dimensions of space. Accounting for these twists and turns in the mechanical form can lead to a mechanical form with a shape that cannot be easily stacked in a VPI chamber. This limits the number of mechanical forms and form coils that can be processed at the same time, resulting in unutilized wasted space in the VPI chamber. Thus, to optimize the number of mechanical forms that can be fitted in a VPI chamber, the end-turn portions of cavity 610 may have a flat rectangular shape as shown in FIG. 6 to allow the end-turn portions of form coil 620 to take on a semi-freeform shape during coil impregnation. The end-turn portions of form coil 620 can be reshaped to the final desired geometry after coil impregnation.

Mechanical form 600 shown in FIG. 6 also includes a cut-out section 630 in the center of mechanical form 600 to define the interior shape of cavity 610. Cut-out section 630 reduces the volume of cavity 610 to prevent excess resin build-up and reduce the amount of discarded excess resin material as discussed above. In an alternative embodiment, mechanical form 600 may have a cut-out section with a different shape, or may not have a cut-out section at all to make the mechanical form easier to manufacture.

It should be appreciated that while mechanical forms 500 and 600 have been shown to accommodate one form coil, a mechanical form according to other embodiments can be designed to accommodate multiple form coils. For example, a mechanical form according to an exemplary embodiment can be designed to accommodate two or more form coils, such as three form coils or up to ten or more form coils. The cavity in such a mechanical form may include grooves in the cavity to hold each of the multiple form coils in place along the same plane. Additionally or alternatively, the cavity in such a mechanical form may extend vertically out from the plane of the figure to hold the multiple form coils in a vertically stacked configuration.

According to an embodiment, after one or more mechanical forms are each fitted with one or more wrapped form coils, the one or more mechanical forms are placed in a VPI chamber for coil impregnation. The VPI chamber may contain a single form coil and mechanical form, multiple form coils and multiple mechanical forms, a single mechanical form accommodating multiple form coils, or combinations thereof. After the form coils and mechanical forms are inserted into the VPI chamber, the VPI chamber is evacuated by a vacuum pump to a predetermined vacuum level for an appropriate period of time depending on the size of the VPI chamber and the desired vacuum level. Resin is then admitted to the chamber. The resin used for the VPI process for coil impregnation according to various embodiments can be an epoxy resin, a polyester resin, a silicone resin, a polyesterimide resin, combinations thereof, or other types of resin that are suitable for impregnation using VPI. After filling the VPI chamber or covering the form coil fully, the resin is pressurized to a predetermined impregnating pressure. According to one embodiment, the impregnating pressure can be approximately 90 pounds-per-square-inch (psi) (e.g., ±10% of 90 psi). In other embodiments, the impregnating pressure can be a pressure in the range of approximately 60 psi (e.g., ±10% of 60 psi) up to approximately 120 psi (e.g., ±10% of 120 psi). The pressure may be relieved and reapplied a number of times over a suitable interval to ensure a maximum number of voids are filled with resin in the form coil insulation. At the end of this process, the pressure in the VPI chamber will be maintained at or above atmospheric level at a pressure suitable for the subsequent partial curing process of the resin. Although not required by the invention, in some embodiments, the predetermined pressure applied during the partial curing process is the same as the impregnating pressure.

While at the predetermined pressure suitable for partially curing the resin being used, heat is applied to the mechanical forms containing the form coils to "set" the resin into a partially cured gelled state while the form coils are in the VPI chamber. The level of curing resulting from the partial curing process is such that the viscosity and/or surface tension of the resin is high enough to prevent it from weeping out of the form coil wrapping layers. This level of curing may depend on the chemistry of the resin being used. The heat used to set the resin into a partially cured gelled state can be applied via an external source (e.g., an oven), a heater integral to the mechanical form, via electrical currents applied to and flowing in the form coil itself, or combinations thereof. Because the form coils are held in a mechanical form, the mechanical form and the form coil(s) contained therein can be heated locally and individually without requiring the entire contents of the VPI chamber to be uniformly heated. This allows selective heating of the resin held within the mechanical form without subjecting excess resin material outside of the mechanical form to the same temperature. As a result, the form coils can be subjected to the partial cure process independently from the VPI chamber, and waste of excess resin material can be reduced.

The partial curing time and partial curing temperature depend on the chemistry of the resin being used. The partial curing temperature to partially cure the resin into a gelled state can be in a range between half of the full cure temperature to two-thirds of the full cure temperature of the resin being used. The full cure temperature is the temperature that is used to fully cure the resin into a hard solid state. According to various embodiments, the partial curing temperature to partially cure the resin into a gelled state can be in a range between approximately 90 degrees Celsius (C) (e.g., ±10% of 90° C.) up to approximately 130° C. (e.g., ±10% of 130° C.). For example, for an epoxy resin according to one embodiment, the full cure temperature can be approximately 170° C. (e.g., ±10% of 170° C.), and the partial curing temperature can be approximately 100° C. (e.g., ±10% of 100° C.). For an epoxy resin according to another embodiment, the full cure temperature can be approximately 200° C. (e.g., ±10° % of 200° C.), and the partial curing temperature can be approximately 120° C. (e.g., ±10% of 120° C.). In this exemplary embodiment, a current of approximately 20 amps (A) (e.g., ±10% of 20 A) can be applied to the form coils for approximately 10 minutes (e.g., ±10% of 10 minutes) to heat the form coils to a partial curing temperature of approximately 120° C. Of course, the current utilized will depend on the resistance, cross-sectional area, and the like.

According to some embodiments, a temperature gradient can be applied to the mechanical form and form coil(s) contained therein to set different temperatures to the different portions of the form coil. For example, the end-turn portions of a form coil can be kept at a slightly lower temperature (e.g., −5% to −20% degrees) relative to the slot portions of the form coil to keep the end-turn portions from curing as far as the slot portions of the form coil. This provides additional flexibility of the end-turn portions for insertion into the slots of a stator. In embodiments in which the shape of the end-turn portions are not set by the mechanical form (e.g., mechanical form 600), a cooler temperature (e.g., −20% to −30% degrees) relative to the slot portions can be applied to the end-turn portions to maximize the flexibility to allow the end-turn portions to be subsequently reshaped into the final desired geometry.

After the partial curing process, the form coils and mechanical forms are removed from the VPI chamber. It should be understood that when the form coils are removed from the VPI chamber, the form coils including the slot portions and the end-turn portions are in a partially cured gelled state. The partially cured gelled state of the form coils prevents resin drainage that tends to occur when removing the form coils from the VPI chamber. In some embodiments, the form coils can be installed into a stator while the form coils are still in the partially cured gelled state right after the coil impregnation and partial curing.

Alternatively, the form coils can remain in and be stored in the mechanical forms or in another appropriate rack or form for an extended period of time under environmentally controlled conditions to maintain the form coils in the partially cured gelled state. For example, the form coils can be stored at a temperature that is at approximately the partial curing temperature or lower to maintain the form coils in the partially gelled state. The form coils can be stored under the environmentally controlled conditions for an extended period of time such as a day, a week, or months, or a period of time that is greater than the full curing time of the form coil. When the form coils are ready to be installed into a stator, the form coils can be removed from storage and inserted into the stator while the form coils are still in the partially cured gelled state. The flexibility of both the slot portions and the end-turn portions provided by the partially cured gelled state of the form coil allows the form coils to be used in a wider range of machines over conventional fully cured coils, including machines that may have a stator with small slot pitch (e.g., high pole number permanent magnet motors).

After the stator is populated with form coils and connections are made, the stator assembly with the installed form coils may undergo an additional global VPI process or an additional resin dip to provide a solid mechanical bond between the form coils and the slots of the stator. Air pockets that may reside between the insulation of the form coil and the slot surface of the stator can be removed during the global VPI process to improve heat dissipation and further minimize partial discharge effects during operation. The resin used for this global VPI process can be the same resin material that was using during coil impregnation, or can be a compatible resin that has superior mechanical properties. After the global VPI process, the stator assembly can be fully cured in an oven by heating the stator assembly to the full cure temperature of the resin to form a void-free insulating bond between the iron stator to the wire core of the form coils.

Figure 7:
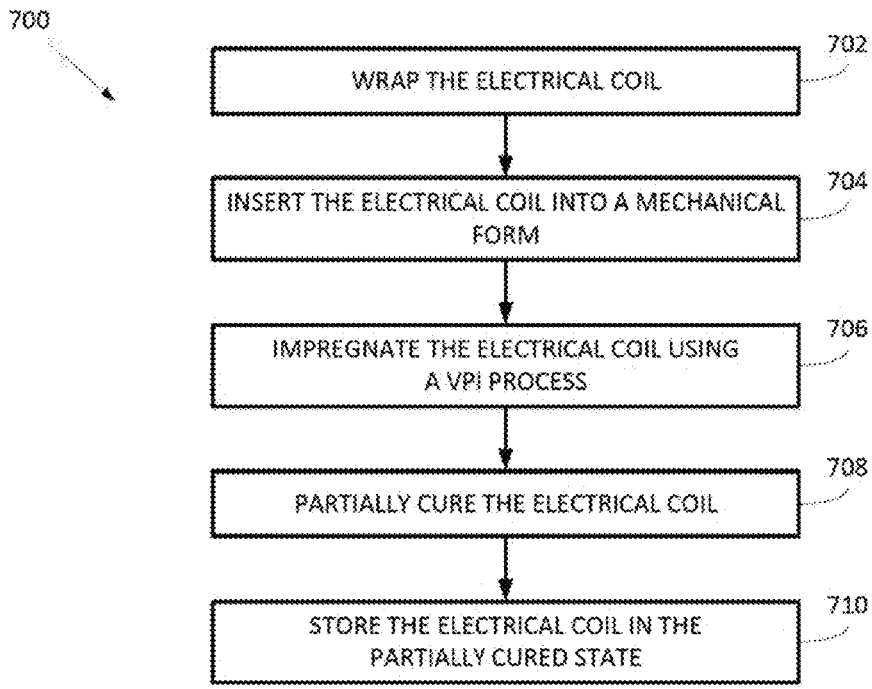
FIG. 7 illustrates a method for fabricating an electrical coil, according to an embodiment of the present invention.

FIG. 7 is a simplified flowchart illustrating a method 700 of fabricating an electrical coil for use in an electric machine stator according to an embodiment of the present invention. At block 702, an electrical coil, such as form coil, is wrapped with one or more wrapping layers. The slot portions of the electrical coil can be wrapped in at least one of a mica tape, semi-conductive or conductive tape, an insulating slot liner, and/or a semi-conductive or conductive slot liner, or according to the any of the wrapping options described above with reference to FIGS. 3A-3D. The end-turn portions of the electrical coil can be wrapped in at least one of a mica tape and/or a semi-conductive, or according to the any of the wrapping options described above with reference to FIGS. 4A-4B.

At block 704, the wrapped electrical coil is inserted into a mechanical form (e.g., mechanical form 500 or 600). The mechanical form can be configured to set the shape of the slot portions of the electrical coil, or alternatively set the shape of both the slot portions and the end-turn portions of the electrical coil. A single mechanical for can also be designed to accommodate more than one electrical coil. At block 706, the electrical coil held in the mechanical form is put into a VPI chamber and impregnated with resin using a VPI process, such as the coil impregnation VPI process described above.

At block 708, the electrical coil is partially cured into a gelled state. In some embodiments, the electrical coil is partially cured while the electrical coil is still in the VPI chamber. The electrical coil can be partially cured using any of the techniques described above including applying an external heat source to the mechanical form, applying heat to the electrical coil using an integrated heat source provided in the mechanical form, or passing electrical current through the electrical coil, or any combination thereof to heat the electrical coil to the partial curing temperature. When utilizing electrical current to heat the coil, suitable electrical leads can be providing passing through the walls of the VPI chamber, such as a glass, insulated electrical feed-through connection. The electrical coil and the mechanical form can be heated to the partial curing temperature independently from the temperature of the VPI chamber. In some embodiments, at least a portion of the partial curing process may be performed at atmospheric pressure and/or at an elevated pressure such as any of the pressure levels described above.

At block 710, the electrical coil is removed from the VPI chamber and stored under environmentally controlled conditions to maintain the electrical coil in the partially cured gelled state until the electrical coil is ready to be installed into an electric machine stator. In some embodiments, the electrical coil remains in the mechanical form during storage. When installation into the electric machine stator is ready to be performed, the electrical coil is removed from storage and installed into the electric machine stator by inserting the electrical coil into the receiving slots of the electric machine stator while the electrical coil is still in the partially cured state. In an alternative embodiment, the step of storing the electrical coil can be omitted, and the electrical coil is installed into the electric machine stator right after the partial curing process.

It should be appreciated that the specific steps illustrated in FIG. 7 provide a particular method of fabricating an electrical coil for use in an electric machine stator according to an embodiment of the present invention. Other sequences of steps may also be performed according to alternative embodiments. For example, alternative embodiments of the present invention may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8:
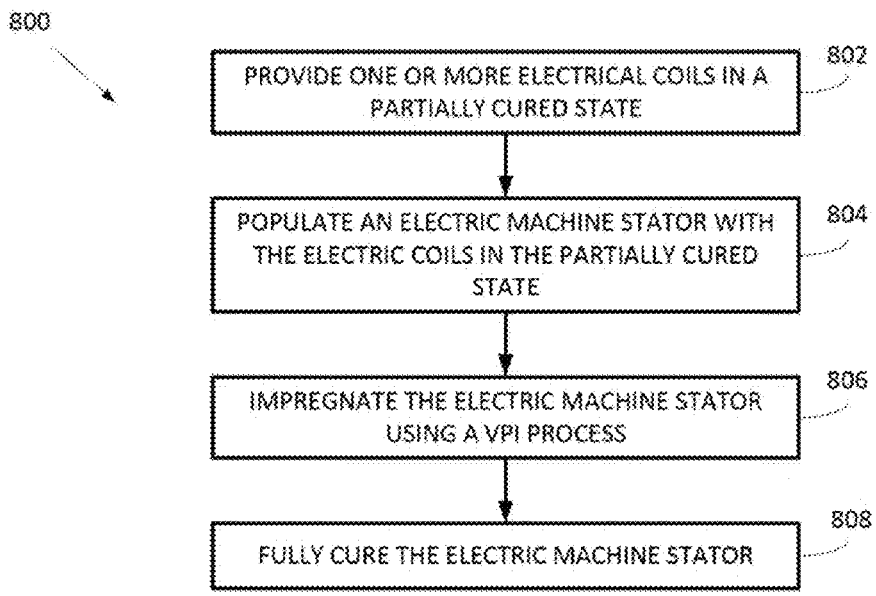
FIG. 8 illustrates a method for fabricating an electric machine stator, according to an embodiment of the present invention.

FIG. 8 is a simplified flowchart illustrating a method of fabricating an electric machine stator according to an embodiment of the present invention. At block 802, one or more electrical coils in a partially cured gelled state are provided. The one or more electrical coils can be provided in the partially cured gelled state by first impregnating the electrical coils with resin using a VPI process such as the process described with reference to method 700. This coil impregnation is performed on the electrical coils separately without the electric machine stator. At block 804, the electric machine stator is populated with the electrical coils while the electrical coils are still in the partially cured gelled state.

After the electric machine stator has been fully populated with the electrical coils, at block 806, the electric machine stator with the installed electrical coils are impregnated with resin with a VPI process. The VPI process performed at block 806 is a global VPI process that is performed on the entire electric machine stator assembly. Alternatively, the electric machine stator with the installed electrical coils can be dipped in resin. At block 808, after the electric machine stator with the installed electrical coils has been impregnated with resin, the electric machine stator assembly is fully cured to solidify the resin. In some embodiments, the electric machine stator assembly can be fully cured in an oven by heating the electric machine stator assembly to the full cure temperature of the resin in the oven.

In another embodiment, the electrical coils can be installed in an uncured state so that the stator is populated with the electrical coils. The stator can be impregnated in a VPI machine to form a VPI-treated stator. The stator can subsequently be cured, for example, by thermal treatment to complete the fabrication process. One of ordinary skill in the art would recognize many variations, modifications, and alternatives.

It should be appreciated that the specific steps illustrated in FIG. 8 provide a particular method of fabricating an electric machine stator according to an embodiment of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of fabricating an electrical coil for use in an electric machine stator, the method comprising:
    inserting the electrical coil into a mechanical form;
    impregnating the electrical coil using a vacuum pressure impregnated (VPI) process;
    partially curing the electrical coil;
    storing the electrical coil in the partially cured state; and
    removing the electrical coil from storage and installing the electrical coil into the electric machine stator while the electrical coil is in the partially cured state.

2. The method of claim 1 wherein the electrical coil is partially cured in the VPI chamber.

3. The method of claim 1 wherein partially curing the electrical coil comprises applying an external heat source to the mechanical form.

4. The method of claim 1 wherein the mechanical form includes an integral heat source, and wherein partially curing the electrical coil comprise applying heat to the electrical coil using the integral heat source.

5. The method of claim 1 wherein partially curing electrical coil comprises flowing electrical current through the electrical coil.

6. The method of claim 1 wherein at least a portion of partially curing the electrical coil is performed at atmospheric pressure.

7. The method of claim 1 wherein at least a portion of partially curing the one or more electrical coils is performed at elevated pressure.

8. The method of claim 7 wherein the electrical coil comprises slot portions and end-turn portions, and wherein slot portions are wrapped in at least one of a mica tape, a semi-conductive tape, an insulating slot liner, or a semi-conductive slot liner prior to being inserted into the mechanical form.

9. The method of claim 8 wherein the end-turn portions are wrapped in at least one of a mica tape, or a semi-conductive tape prior to being inserted into the mechanical form.

10. The method of claim 9 wherein the mechanical form sets the shape of only the slot portions of the electrical coil.

11. The method of claim 9 wherein the mechanical form sets the shape of both the slot portions and the end-turn portions of the electrical coil.

\* \* \* \* \*